(12) United States Patent
Uematsu

(10) Patent No.: US 10,773,744 B2
(45) Date of Patent: Sep. 15, 2020

(54) STEERING WHEEL COVERING MEMBER, STEERING WHEEL, AND MANUFACTURING METHOD OF STEERING WHEEL

(71) Applicant: NIHON PLAST CO., LTD., Shizuoka (JP)

(72) Inventor: Nobutaka Uematsu, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 16/292,526

(22) Filed: Mar. 5, 2019

(65) Prior Publication Data

US 2019/0291770 A1 Sep. 26, 2019

(30) Foreign Application Priority Data

Mar. 23, 2018 (JP) ................................. 2018-057037

(51) Int. Cl.
  *B62D 1/06* (2006.01)
(52) U.S. Cl.
  CPC ............... *B62D 1/06* (2013.01); *B62D 1/065* (2013.01)
(58) Field of Classification Search
  CPC . B62D 1/04; B62D 1/046; B62D 1/06; B62D 1/065; B62D 1/08; B21D 53/30; B21D 53/32
  See application file for complete search history.

(56) References Cited

U.S. PATENT DOCUMENTS

| 5,205,186 | A * | 4/1993 | Draxlmaier, Sr. | ....... B62D 1/06 74/552 |
| 6,414,270 | B1 * | 7/2002 | Sugiyama | ............... B62D 1/065 219/204 |
| 10,081,383 | B2 * | 9/2018 | Seki | .......................... H05B 3/34 |
| 10,202,137 | B2 * | 2/2019 | Okazaki | ................... B62D 1/06 |
| 2013/0276573 | A1 * | 10/2013 | Henning | .................. B62D 1/06 74/558 |
| 2015/0344061 | A1 * | 12/2015 | Uematsu | ................ B62D 1/065 219/204 |
| 2015/0369633 | A1 * | 12/2015 | Karasawa | ................ G01D 5/24 324/686 |
| 2017/0079089 | A1 * | 3/2017 | Okazaki | ................ B60R 16/027 |
| 2019/0241204 | A1 * | 8/2019 | Uematsu | .................. B62D 1/06 |

FOREIGN PATENT DOCUMENTS

| DE | 102017111297 A1 * | 6/2018 | ............. B62D 1/046 |
| JP | 2000043736 A * | 2/2000 | |
| JP | 2015-189294 A | 11/2015 | |

* cited by examiner

*Primary Examiner* — Adam D Rogers
(74) *Attorney, Agent, or Firm* — Brundidge & Stanger, P.C.

(57) ABSTRACT

There is provided a steering wheel covering member which is capable of disposing a wire in an opening edge of a recessed portion of a rim section main body portion and which is easy to be attached to the rim section main body portion, a steering wheel, and a manufacturing method of a steering wheel. The steering wheel covering member includes sheet-shaped sheet member having dividing portion that is a cut-out portion. The steering wheel covering member includes wire that is held on sheet member excluding non-setting area A along dividing portion. The dividing portion is accommodated in recessed portion such that dividing portion and non-setting area A of wire are disposed inward of an opening edge of recessed portion.

5 Claims, 3 Drawing Sheets

STEERING WHEEL COVERING MEMBER, STEERING WHEEL, AND MANUFACTURING METHOD OF STEERING WHEEL

CROSS REFERENCE TO RELATED APPLICATIONS

This application is entitled to the benefit of Japanese Patent Application No. 2018-057037, filed on Mar. 23, 2018, the disclosure of which including the specification, drawings and abstract is incorporated herein by reference in its entirety.

TECHNICAL FIELD

The present invention relates to a steering wheel covering member that constitutes a grip section of a steering wheel which is gripped and operated by a driver together with a grip section main body portion, the steering wheel including the steering wheel covering member, and a manufacturing method of a steering wheel.

BACKGROUND ART

In recent years, it has been demanded to add additional functions to a steering wheel of an automobile. For example, a configuration is known in which a sheet having an electric circuit such as a heater or a sensor unit is placed under an outer skin section of a rim section which is a grip section of a steering wheel (for example, see PTL 1).

CITATION LIST

Patent Literature

PTL 1
Japanese Patent Application Laid-Open No. 2015-189294 (pp. 5 to 9 and FIG. 2)

SUMMARY OF INVENTION

Technical Problem

Meanwhile, in recent years, there has been increasing demand for design of the steering wheel of the automobile. For example, demand for steering wheels and the like which are subjected to a so-called grain-patterned external treatment, in which a groove portion is set on an occupant side or an outer peripheral portion of the rim section and a terminal portion of the outer skin section is buried in the groove portion, is also increasing.

In the steering wheel, since the heater or the sensor cannot be set continuously at a position around the groove portion in general, it is needed to extend an operating range of a functional component as much as possible at the position around the groove portion.

The present invention has been made in view of the above circumstances, and an object of the present invention is to provide a steering wheel covering member which is capable of disposing a held body in an opening edge of a recessed portion of a grip section main body portion and which is easy to be attached to the grip section main body portion, a steering wheel including the steering wheel covering member, and a manufacturing method of a steering wheel.

Solution to Problem

In a first aspect, there is provided a steering wheel covering member that covers at least a part of a grip section main body portion having a recessed portion to be wrapped and fixed, and that constitutes a grip section which is gripped and operated by a driver together with the grip section main body portion. The steering wheel covering member includes a sheet-shaped covering member main body that has a dividing portion that is a cut-out portion, and a held body that is held on the covering member main body excluding a non-setting area along the dividing portion, in which the dividing portion is accommodated in the recessed portion such that the dividing portion and the non-setting area of the held body are disposed inward of an opening edge of the recessed portion.

In a second aspect, in the steering wheel covering member according to the first aspect, both edge portions of the dividing portion substantially coincide with each other in a natural state.

In a third aspect, in the steering wheel covering member according to the first or second aspect, the held body is one of a heater and a sensor.

In a fourth aspect, there is provided a steering wheel that has a grip section which is gripped and operated by a driver. The grip section includes a grip section main body portion having a recessed portion, and the steering wheel covering member according to any one of the first to third aspects, which covers at least a part of the grip section main body portion to be wrapped and fixed.

In a fifth aspect, there is provided a manufacturing method of a steering wheel that has a grip section which includes a grip section main body portion having a recessed portion and which is gripped and operated by a driver. The method includes using a steering wheel covering member that includes a sheet-shaped covering member main body having a division-planned portion and a held body that is held on the covering member main body excluding a non-setting area along the division-planned portion, wrapping the steering wheel covering member around the grip section main body portion to be fixed such that the division-planned portion is aligned in the recessed portion, and forming a dividing portion by cutting out the covering member main body at the division-planned portion and accommodating the dividing portion in the recessed portion such that the dividing portion and the non-setting area of the held body are disposed inward of an opening edge of the recessed portion.

Advantageous Effects of Invention

With the steering wheel covering member according to the first aspect, the dividing portion, which is formed in the covering member main body and is the cut-out portion, is accommodated in the recessed portion such that the dividing portion and the non-setting area of the held body are disposed inward of the opening edge of the recessed portion. In this way, it is possible to easily dispose the held body in the opening edge of the recessed portion of the grip section main body portion, and to handle the covering member main body substantially as a single sheet shape when attaching to the grip section main body portion, which makes the steering wheel covering member easy to be attached to the grip section main body portion.

With the steering wheel covering member according to the second aspect, in addition to the effect of the steering wheel covering member according to the first aspect, both edge portions of the dividing portion substantially coincide with each other in a natural state. As a result, it is possible to cut out the covering member main body to form the dividing portion and thus, to handle the covering member main body as a single sheet shape until the covering member main body cuts out as mentioned above, which makes the steering wheel covering member easy to be attached to the grip section main body portion.

With the steering wheel covering member according to the third aspect, in addition to the effect of the steering wheel covering member according to the first or second aspect, when the held body is used as a heater, it is possible to suppress generation of a portion hard to get warm in the grip section, and when the held body is used as a sensor, it is possible to suppress generation of a portion hard to detect gripping by the driver in the grip section.

With the steering wheel according to the fourth aspect, the held body of the steering wheel covering member is disposed in the opening edge of the recessed portion of the grip section main body portion so that the arrangement range of the held body can be formed widely in the grip section main body portion. In addition, since the steering wheel covering member can be easily attached to the grip section main body portion, the manufacturability of the steering wheel can be improved.

With the manufacturing method of a steering wheel according to the fifth aspect, after attaching the steering wheel covering member to the grip section main body portion, the division-planned portion of the covering member main body is cut out to form the dividing portion, so that the covering member main body can be handled as a single sheet shape until the division-planned portion is cut out and it is easy to attach the steering wheel covering member to the grip section main body portion. In addition, since the dividing portion formed by cutting out the division-planned portion is accommodated in the recessed portion to be disposed inward of the opening edge of the recessed portion together with the non-setting area of the held body, the held body can be easily disposed in the opening edge of the recessed portion of the grip section main body portion.

DESCRIPTION OF EMBODIMENTS

Hereinafter, a configuration of Embodiment 1 according to the present invention will be described with reference to the drawings.

Figure 3A:
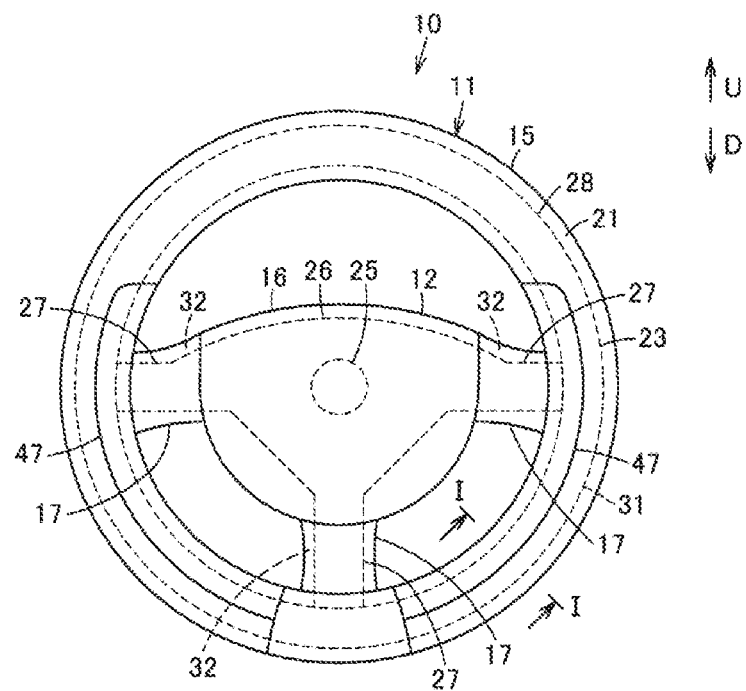
FIG. 3A is a front view of the steering wheel.
Figure 3B:
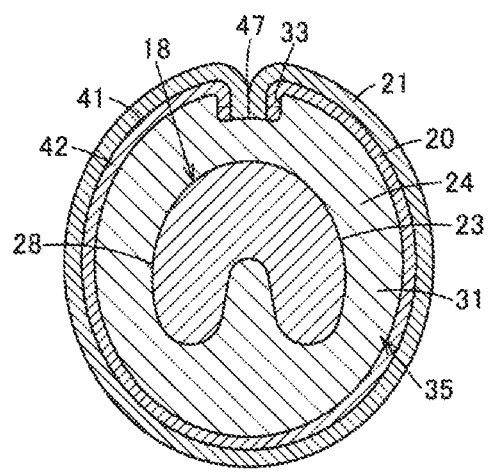
FIG. 3B is a sectional view of a position corresponding to I-I in FIG. 3A.

In FIGS. 3A and 3B, reference sign 10 represents a steering wheel of an automobile as a vehicle, for example. Steering wheel 10 includes steering wheel main body 11, pad body 12 which is mounted on an occupant side of steering wheel main body 11, and the like. Steering wheel 10 is mounted on a steering shaft provided in a vehicle in a state of being inclined normally. Hereinafter, when steering wheel 10 is viewed from a driver (occupant) side, the direction of arrow U is represented as an upper side, the direction of arrow D is represented as a lower side, a front side, that is, a windshield side on an upper front side, of the vehicle is represented as the front side or a back surface side of the steering wheel 10, and a rear side, that is, a lower rear side, of the vehicle is represented as the rear side or a front surface side of the steering wheel 10.

Steering wheel main body 11 is configured to include rim section (grip section) 15 as a grip section, boss section 16 that is positioned on an inner side of rim section 15, and a plurality of spoke sections 17 that connects rim section 15 and boss section 16 to each other; here, three spoke sections 17 are provided on the right and left sides and a lower side in the embodiment. In addition, steering wheel main body 11 has steering wheel base section 18. In addition, steering wheel main body 11 has steering wheel covering member 20 (hereinafter, simply referred to as covering member 20). Further, steering wheel main body 11 has outer skin section 21. Then, steering wheel main body 11 has a cover body not shown.

Rim section 15 is a part which is gripped and operated by a driver (occupant). At least a part of rim section 15 is formed along an arc. In the embodiment, rim section 15 is formed in an annular shape. In the following description, sections of steering wheel main body 11 are disposed on the right, left, top and bottom sides with respect to a neutral position of steering wheel 10 as a reference.

Steering wheel base section 18 has core 23 and resin layer 24 that covers a part of core 23 and that is covered with covering member 20.

For example, core 23 is made of metal and includes substantially cylindrical boss 25 having a serration structure of intermeshing with the steering shaft on the back surface side of boss section 16 which faces a vehicle body, and boss plate 26 that constitutes the core is integrally fixed to boss 25. In this manner, spoke core sections 27 corresponding to spoke sections 17 are formed continuously and integrally from boss plate 26. Further, rim core section 28 as a grip section core corresponding to rim section 15 is fixed to spoke core section 27 of spoke section 17 by welding or the like.

Spoke core section 27 is radially provided. Spoke core section 27 may not need to correspond to all the spoke sections 17, or a part of spoke sections 17 may be configured to include a finisher or a cover body without including spoke core section 27. In the embodiment, spoke core section 27 projects from right, left, and lower sides of boss plate 26 and each of the spoke core sections is connected to rim core section 28.

Rim core section 28 constitutes a part of rim section 15. Rim core section 28 is formed in a shape corresponding to a shape of rim section 15. That is, rim core section 28 is formed in an annular shape depending on the shape of rim section 15; for example, at least a part of the rim core section is formed along an arc. In the embodiment, rim core section 28 is formed in an annular shape.

Resin layer 24 is formed to cover at least rim core section 28. In the embodiment, resin layer 24 is formed to cover entire rim core section 28 and a part of spoke core section 27, for example. More specifically, resin layer 24 integrally includes rim covering section 31 as a grip section covering portion that covers rim core section 28 at the position of rim section 15, and spoke covering section 32 that covers a region of a predetermined distance from an end portion of spoke core section 27 that is continuous with rim core section 28 at the position of spoke section 17. In addition, resin layer 24 is formed to have a substantially circular cross section, for example. For example, the material obtained by finely foaming a soft foamed polyurethane resin is used for resin layer 24. In addition, recessed portion 33 for fixing a part of outer skin section 21 is formed in resin layer 24. In this manner, resin layer 24 is formed by using a forming mold (die) not shown. The forming mold includes one half mold and the other half mold, schematically, and a cavity that is formed between the one half mold and the other half mold is filled with a synthetic resin raw material.

Rim covering section 31, together with rim core section 28, constitutes rim section main body portion 35 as a grip section main body portion constituting rim section 15. That is, resin layer 24, together with core 23, constitutes rim section main body portion 35. At least a part of rim section main body portion 35 is formed along an arc. In the embodiment, rim section main body portion 35 is formed in an annular shape.

Spoke covering section 32 is continuous with rim covering section 31 and projects from rim covering section 31 toward spoke core section 27. In the embodiment, spoke covering sections 32 are formed at positions corresponding to right and left spoke sections 17 (spoke core section 27), for example.

In the embodiment, recessed portion 33 is formed in rim section main body portion 35 along the arc (circumference) of rim section main body portion 35, for example. Recessed portion 33 is formed in a groove shape having a predetermined width. In addition, for example, in the embodiment, at least a part of recessed portion 33 on a surface of resin layer 24 (rim section main body portion 35) is positioned on the rear side (front surface side) which faces the occupant. In the embodiment, recessed portion 33 is formed continuously, for example, from a position above the right and left spoke sections 17 to positions of both sides of lower spoke section 17. For example, recessed portion 33 may be formed at the same time when resin layer 24 is formed by the forming mold or may be formed by performing processing after resin layer 24 is formed. Further, recessed portion 33 may be formed in a circumferential direction (latitude direction) along a position of the outermost circumference of rim section main body portion 35, for example.

Covering member 20 shown in FIGS. 1A to 3B is referred to as an element or the like and is disposed from a position to cover rim core section 28 of resin layer 24, that is, rim covering section 31, to a position to cover a part of spoke core section 27, that is, spoke covering section 32. Covering member 20 includes sheet member (mat portion) 41 as a covering member main body formed in a sheet shape and wire 42 as a held body that is held on sheet member 41.

Further, covering member 20 covers a surface of resin layer 24 (rim section main body portion 35) and is bonded to be fixed to the surface of resin layer 24 (rim section main body portion 35) with an adhesive (not shown). In the embodiment, covering member 20 is used as a sensor unit for detecting the gripping (presence or absence of gripping) of rim section 15 by the driver, for example.

Sheet member 41 integrally includes a first covering portion that covers rim covering section 31 (rim section main body portion 35) and a second covering portion that projects from the first covering portion to cover a part of spoke covering section 32; however, in the drawings, only the first covering portion is shown and the second covering portion is omitted. Sheet member 41 (first covering portion) is formed in a rectangular shape in a natural state. Further, division-planned portion 44 is formed at a position corresponding to recessed portion 33 in sheet member 41. Sheet member 41 may be formed by joining sheet member pieces as a plurality of covering member main body pieces in a longitudinal direction through sewing or the like. In addition, a notch portion or the like for absorbing a dimensional difference between the inner periphery and the outer periphery of rim section main body portion 35 may be formed on both side portions and the like of sheet member 41.

Division-planned portion 44 is a perforation in which cut-out portions are intermittently formed, or a simple guide line or the like. In the embodiment, division-planned portion 44 is formed in advance in the longitudinal direction of sheet member 41 to have a predetermined length corresponding to the length of recessed portion 33. Then, in a state of being attached to rim section main body portion 35, division-planned portion 44 is cut out by a jig (not shown) such as an edged tool to form dividing portion 45 that is a cut-out portion in sheet member 41. In this case, dividing portion 45 may be formed by cutting out entire division-planned portion 44, or may be formed by cutting out a part of division-planned portion 44, and may be formed by cutting out sheet member 41 to an extended position of division-planned portion 44. Therefore, dividing portion 45 is basically formed in the same range as division-planned portion 44, but it may be set to a narrower range than division-planned portion 44, or may be set to a wider range than division-planned portion 44, for example.

Wire 42 is a functional component configured to be directly connected to a control circuit, a power supply, or the like not shown or to be indirectly connected thereto via a power receiving section or the like and, in the embodiment, to detect gripping of rim section 15 by the driver by detecting the gripping pressure or the capacitance change of rim section 15 as covering member 20 is energized. That is, wire 42 is a detector of a pressure sensor or a capacitance sensor. Wire 42 is set to occupy a predetermined planar region for sheet member 41 and the region in which wire 42 is set falls within an operating range in which the sensor unit operates in rim section 15. Further, wire 42 has non-setting area (first non-setting area) A along division-planned portion 44 in sheet member 41 (white part in FIG. 2). Non-setting area A is set to have predetermined widths on both sides of division-planned portion 44. The predetermined width of non-setting area A with respect to division-planned portion 44 is set as the arrangement limit of wire 42 for sheet member 41 in the manufacturing process of covering member 20. That is, non-setting area A is a region where wire 42 cannot be arranged due to restriction of a manufacturing apparatus or the like in which wire 42 is arranged on sheet member 41 avoiding division-planned portion 44. In the embodiment, the predetermined width is set to about 3 mm, for example. Therefore, non-setting area A is set to, for example, about 6 mm. The width dimension of non-setting area A is set to be equal to or smaller than the width dimension of recessed portion 33, preferably smaller than the width dimension of recessed portion 33. In addition, both end portions of non-setting area A are positioned inward of recessed portion 33 with respect to both end portions of recessed portion 33. That is, non-setting area A is in an area equal to or smaller than recessed portion 33, preferably smaller than recessed portion 33. Wire 42 also has non-setting areas (second non-setting area) B at both edge portions of sheet member 41. Similar to non-setting area A, non-setting areas B are set as the arrangement limit of wire 42 for sheet member 41 in the manufacturing process of covering member 20. That is, non-setting areas B are regions where wire 42 cannot be arranged with respect to the both edge portions of sheet member 41 due to restriction of a manufacturing apparatus or the like for arranging wire 42 on sheet member 41.

The adhesive adheres and fixes covering member 20 to resin layer 24 (rim section main body portion 35). The adhesive is set to at least any one of covering member 20 and resin layer 24 (rim section main body portion 35). The adhesive may be set in advance on the back side of sheet member 41 of covering member 20, that is, on the side of rim section main body portion 35, or may be applied when attaching covering member 20 to rim section main body portion 35.

Outer skin section 21 shown in FIGS. 3A and 3B is a part that is directly gripped by the driver (occupant) and is a decorative part of steering wheel 10. Outer skin section 21 is formed in a sheet shape by leather such as natural leather or synthetic leather, a synthetic resin, or the like. Outer skin section 21 covers covering member 20 and is attached to rim section main body portion 35. For example, outer skin section 21 covers covering member 20 and is disposed to continuously cover the entire surface of rim section main body portion 35. In the embodiment, terminal portions 21a and 21a of outer skin section 21 are each dropped and fixed at the position of recessed portion 33, and a so-called grain-patterned design portion 47 is formed on the driver (occupant) side of rim section 15.

The cover body is also referred to as a back cover, a lower cover, or a body cover, is formed of a synthetic resin or the like, and covers a lower portion of boss section 16.

As pad body 12, it is possible to use an airbag apparatus or an apparatus that houses a shock absorber, for example. Pad body 12 may be integrally assembled with a horn switch mechanism as a switch apparatus.

In this manner, when steering wheel 10 is manufactured, core 23 that has been formed in advance is set in the forming mold, and then a synthetic resin raw material is agitated and mixed to be injected into a cavity of the forming mold, in which the cavity is formed by combining (mold closing) one half mold and the other half mold. As a result, reaction of the synthetic resin raw material is performed with foaming such that polyurethane is obtained and flows toward a flow terminal.

Subsequently, a first intermediate body formed with resin layer 24 covering rim core section 28 in the cavity is released from the forming mold through mold opening of the one half mold and the other half mold, and burr or the like is cut.

Figure 1A:
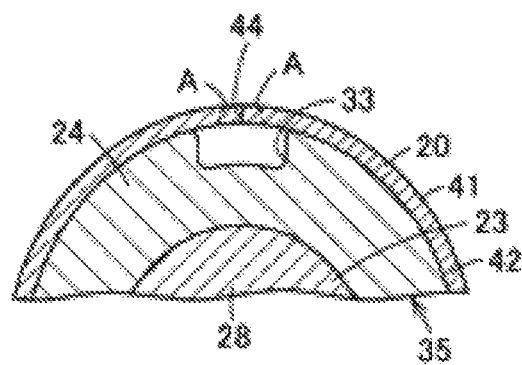
FIG. 1A is a sectional view schematically showing a step of attaching a steering wheel covering member to a grip section main body portion in a manufacturing method of a steering wheel according to Embodiment 1 of the present invention.

Further, covering member 20 that is separately formed is wrapped around the surface of resin layer 24 (rim section main body portion 35) of the first intermediate body and adhered and fixed with the adhesive. In this case, recessed portion 33 is covered with sheet member 41 and division-planned portion 44 is aligned so as to correspond to the position of recessed portion 33 (FIG. 1A).

Figure 1B:
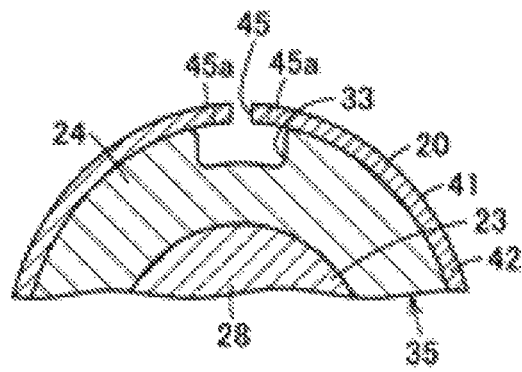
FIG. 1B is a sectional view schematically showing a step of cutting out a covering member main body from a division-planned portion in the manufacturing method of a steering wheel.

In this state, sheet member 41 is cut out along division-planned portion 44 by a jig such as an edged tool to form dividing portion 45 (FIG. 1B).

Figure 1C:
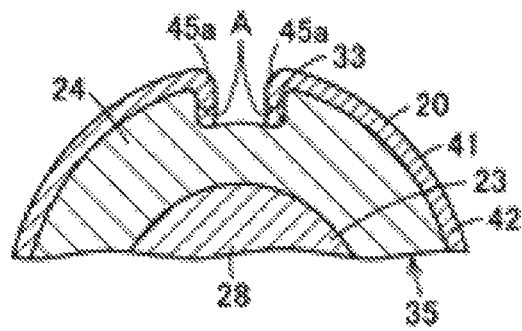
FIG. 1C is a sectional view schematically showing a step of dropping a dividing portion into a recessed portion in the manufacturing method of a steering wheel.

Subsequently, both edge portions 45a and 45a of dividing portion 45 together with non-setting area A of wire 42 are dropped inward of an opening edge of recessed portion 33 and accommodated therein, and fixed to the inner surface of recessed portion 33 with the adhesive (FIG. 1C).

Figure 1D:
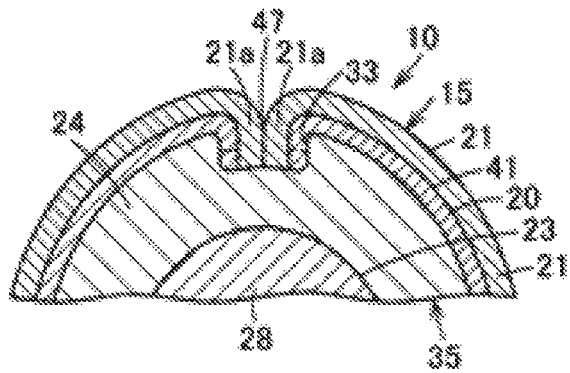
FIG. 1D is a sectional view schematically showing a step of dropping an outer skin section into the recessed portion in the manufacturing method of a steering wheel.
Figure 2:
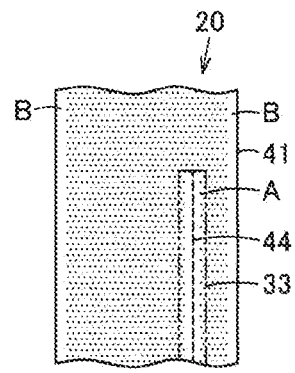
FIG. 2 is a plan view showing a part of the steering wheel covering member.

Then, covering member 20 is covered with outer skin section 21. In this case, outer skin section 21 drops and fixes terminal portions 21a and 21a to recessed portion 33, respectively, to form design portion 47 (FIG. 1D).

Steering wheel main body 11 electrically connects the functional component of covering member 20 to the control circuit, and pad body 12 or cover body is attached such that steering wheel 10 is completed (FIG. 3A).

Thus, in the embodiment, after attaching covering member 20 to rim section main body portion 35, division-planned portion 44 of sheet member 41 is cut out to form dividing portion 45, so that, until division-planned portion 44 is cut out, sheet member 41 can be handled as a single sheet shape having no large hole or branch. That is, since both edge portions 45a and 45a of dividing portion 45 substantially coincide with each other in a natural state, it is possible to cut out sheet member 41 to form dividing portion 45. In addition, sheet member 41 can be handled as a single sheet shape until the opening is formed by cutting in this way. Therefore, it is easy to attach covering member 20 to rim section main body portion 35. Since dividing portion 45 formed by cutting out division-planned portion 44 is accommodated in recessed portion 33 to be disposed inward of the opening edge of recessed portion 33 together with non-setting area A of wire 42, wire 42 can be easily disposed in the opening edge of recessed portion 33 of rim section main body portion 35.

In particular, in the case of steering wheel 10 in which, for example, design portion 47 is continuous over the entire periphery of rim section 15, sheet member 41 is divided by dividing portion 45. Therefore, as in the embodiment, after attaching covering member 20 to rim section main body portion 35, division-planned portion 44 is cut out to form dividing portion 45, so that when attaching covering member 20 to rim section main body portion 35, the covering member can be attached as an integral sheet shape before the division, and the workability of attachment is improved.

Since wire 42 is used as a sensor, wire 42 can be disposed in the opening edge of recessed portion 33 of rim section main body portion 35, so that even when the driver grips grain-patterned design portion 47 in which terminal portions 21a and 21a of outer skin section 21 are dropped into recessed portion 33, the gripping can be detected. Therefore, it is possible to reliably detect whether or not rim section 15 is gripped by the driver irrespective of the gripping position.

Wire 42 of covering member 20 is disposed in the opening edge of recessed portion 33 of rim section main body portion 35 so that the arrangement range of wire 42 can be formed widely in rim section main body portion 35. In addition, since the portion where the function of covering member 20 is weakened can be reduced, the merchantability can be improved, and since covering member 20 can be easily attached to rim section main body portion 35, the manufacturability of steering wheel 10 can be improved.

Figure 4A:
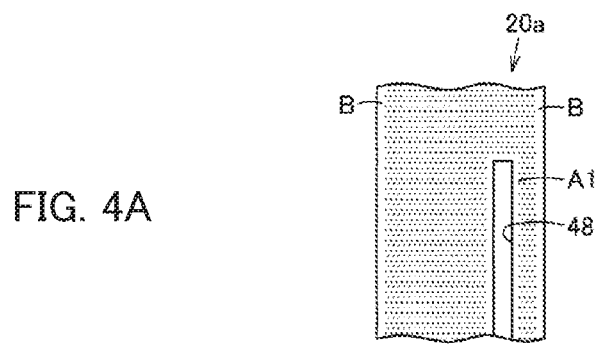
FIG. 4A is a plan view showing a part of a steering wheel covering member of a comparative example.
Figure 4B:
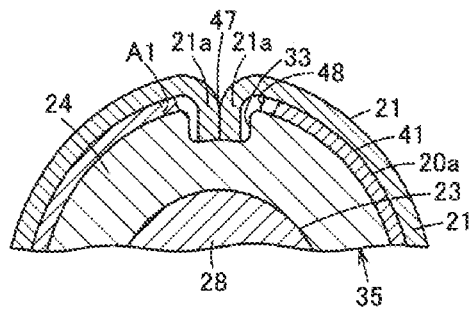
FIG. 4B is a sectional view of a steering wheel of the comparative example.

That is, as in comparative examples shown in FIGS. 4A and 4B, in a case where opening 48 having a range corresponding to the size of recessed portion 33 is formed in sheet member 41, when covering member 20a is attached to rim section main body portion 35 by setting non-setting area A1 of wire 42 around opening 48 due to restriction of a manufacturing apparatus or the like when disposing wire 42 on sheet member 41 avoiding opening 48 in the manufacturing process of covering member 20a, non-setting area A1 is generated on both sides of the opening edge of recessed portion 33. In contrast, in the embodiment, since wire 42 can be disposed to the opening edge of recessed portion 33, wire 42 can be operated in a wide range of rim section 15.

Figure 5A:
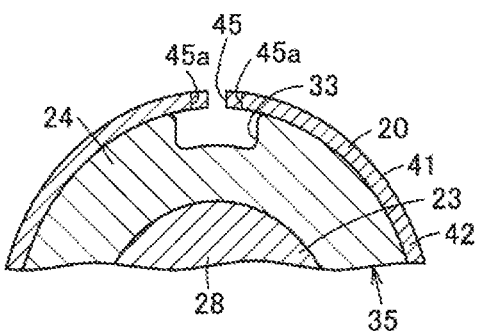
FIG. 5A is a sectional view schematically showing a step of attaching a steering wheel covering member to a grip section main body portion in a manufacturing method of a steering wheel according to Embodiment 2 of the present invention.

Next, Embodiment 2 will be described with reference to FIGS. 5A to 5C. The same reference signs are given to the same configurations and operations as those of Embodiment 1 described above, and the description thereof will be omitted.

In the embodiment, dividing portion 45 of Embodiment 1 described above is formed in sheet member 41 in advance as a cut-out portion. Dividing portion 45 has a narrow slit shape, so that both edge portions 45a and 45a substantially coincide (or exactly coincide) with each other in a natural state (spread state in a planar shape) of covering member 20. In other words, in the embodiment, dividing portion 45 is set as a cut-out portion having almost no width, and sheet member 41 is opened in a state where covering member 20 is deformed to wrap around rim section main body portion 35. That is, covering member 20 can be attached to rim section main body portion 35 substantially as a single sheet shape. Non-setting area A of wire 42 is set along dividing portion 45.

When steering wheel 10 is manufactured, covering member 20 that is separately formed is wrapped around the surface of resin layer 24 (rim section main body portion 35) of the first intermediate body of Embodiment 1 described above and adhered and fixed with an adhesive. In this case, recessed portion 33 is covered with sheet member 41 and dividing portion 45 is aligned so as to correspond to the position of recessed portion 33 (FIG. 5A). In addition, since dividing portion 45 has a slit shape so that both edge portions 45a and 45a of dividing portion 45 substantially coincide with each other in a natural state, when covering member 20 is attached to rim section main body portion 35, sheet member 41 can be handled substantially as a single sheet shape having no large hole or branch. Thus, it is difficult to impair the workability of attachment.

Figure 5B:
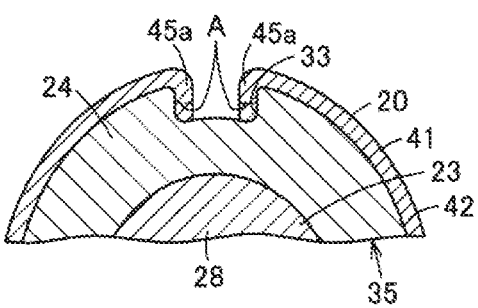
FIG. 5B is a sectional view schematically showing a step of dropping a dividing portion into a recessed portion in the manufacturing method of a steering wheel.
Figure 5C:
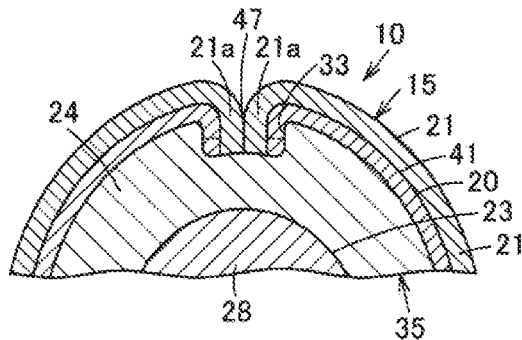
FIG. 5C is a sectional view schematically showing a step of dropping an outer skin section into the recessed portion in the manufacturing method of a steering wheel.

Subsequently, both edge portions 45a and 45a of dividing portion 45 together with non-setting area A of wire 42 are dropped inward of an opening edge of recessed portion 33 and accommodated therein, and fixed to the inner surface of recessed portion 33 with the adhesive (FIG. 5B).

Then, covering member 20 is covered with outer skin section 21. In this case, outer skin section 21 drops and fixes terminal portions to recessed portion 33, respectively (FIG. 5C).

Thus, in the embodiment, since dividing portion 45 is formed in advance as a cut-out portion in sheet member 41, and dividing portion 45 is accommodated in recessed portion 33 to be disposed inward of the opening edge of recessed portion 33 together with non-setting area A of wire 42, wire 42 can be easily disposed in the opening edge of recessed portion 33 of rim section main body portion 35 and an operating range of wire 42 can be extended to the opening edge of recessed portion 33.

In each of the embodiments described above, covering member 20 may be a heater unit for adjusting a temperature of rim section 15, for example. In this case, wire 42 is a heater (heating wire) which generates heat when energized and constitutes a heating circuit formed by a temperature sensor, or the like. Since, when wire 42 is used as a heater, wire 42 can be disposed in the opening edge of recessed portion 33 of rim section main body portion 35, it is possible to warm grain-patterned design portion 47 in which terminal portions 21a and 21a of outer skin section 21 are dropped into recessed portion 33, which makes it possible to suppress generation of a portion hard to get warm in rim section 15. Therefore, it is possible to make the fingers of the driver gripping rim section 15 easy to warm irrespective of the gripping position.

Further, the held body is not limited to wire 42, and it is possible to use any functional component that constitutes a circuit section such as a heater unit or a sensor unit, for example. In addition, as the held body, it is possible to use a magnet (massage magnet), a decorative member, or the like other than the circuit section.

Further, it is possible to optionally set the number or position of recessed portions 33 depending on design or the like of steering wheel 10.

In addition, steering wheel 10 is not limited to the configuration in which three spoke sections 17 are provided, and can have a configuration in which two, four or more spoke sections 17 are provided.

In this manner, steering wheel 10 can be used as a steering wheel for not only a vehicle such as an automobile, but also any other vehicle.

INDUSTRIAL APPLICABILITY

The present invention can be preferably used as a steering element used for a steering wheel of an automobile, for example, a steering wheel including the steering element, and a manufacturing method of a steering wheel.

REFERENCE SIGNS LIST

10 Steering wheel
15 Rim section as grip section
20 Steering wheel covering member
33 Recessed portion
35 Rim section main body portion as grip section main body portion
41 Sheet member as covering member main body
42 Wire as held body
44 Division-planned portion
45 Dividing portion
45a Edge portion
A Non-setting area

What is claimed is:
1. A steering wheel covering member that covers at least a part of a grip section main body portion having a recessed portion to be wrapped and fixed, and that constitutes a grip section which is gripped and operated by a driver together with the grip section main body portion, the steering wheel covering member comprising:
a sheet-shaped covering member main body that has a dividing portion that is a cut-out portion; and
a held body that is held on the covering member main body excluding a non-setting area along the dividing portion, wherein the held body comprises a wire, and wherein the non-setting area comprises an area of the covering member main body where the wire is not arranged and has a predetermined width,
wherein the dividing portion is accommodated in the recessed portion such that the dividing portion and the non-setting area of the held body are disposed inward of an opening edge of the recessed portion.

2. The steering wheel covering member according to claim 1,
wherein the dividing portion is a line-shape cut that extends partially along a longitudinal length of the sheet-shaped covering member main body and both edge portions of the dividing portion substantially coincide with each other when the sheet-shaped covering member main body is spread in a planar shape.

3. The steering wheel covering member according to claim 1,
wherein the held body is one of a heater and a sensor.

4. A steering wheel that has a grip section which is gripped and operated by a driver,
wherein the grip section includes:
a grip section main body portion having a recessed portion, and
the steering wheel covering member according to claim 1, which covers at least a part of the grip section main body portion to be wrapped and fixed.

5. A manufacturing method of a steering wheel that has a grip section which includes a grip section main body portion having a recessed portion and which is gripped and operated by a driver, the method comprising:
using a steering wheel covering member that includes a sheet-shaped covering member main body having a division-planned portion and a held body that is held on the covering member main body excluding a non-setting area along the division-planned portion;
wrapping the steering wheel covering member around the grip section main body portion to be fixed such that the division-planned portion is aligned in the recessed portion; and
forming a dividing portion by cutting out the covering member main body at the division-planned portion and accommodating the dividing portion in the recessed portion such that the dividing portion and the non-setting area of the held body are disposed inward of an opening edge of the recessed portion.

\* \* \* \* \*